(12) United States Patent
Mielenz

(10) Patent No.: US 11,663,918 B2
(45) Date of Patent: May 30, 2023

(54) METHOD AND DEVICE FOR THE OPERATION OF A VEHICLE TO AVOID OR CLEAR A TRAFFIC JAM

(71) Applicant: Robert Bosch GmbH, Stuttgart (DE)

(72) Inventor: Holger Mielenz, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 87 days.

(21) Appl. No.: 16/655,759

(22) Filed: Oct. 17, 2019

(65) Prior Publication Data
US 2020/0160716 A1 May 21, 2020

(30) Foreign Application Priority Data

Nov. 21, 2018 (DE) ...................... 10 2018 219 911.6

(51) Int. Cl.
*G08G 1/16* (2006.01)
*B60W 30/18* (2012.01)
*B60W 30/09* (2012.01)

(52) U.S. Cl.
CPC ............. *G08G 1/166* (2013.01); *B60W 30/09* (2013.01); *B60W 30/18027* (2013.01); *B60W 2554/00* (2020.02); *B60W 2555/60* (2020.02)

(58) Field of Classification Search
CPC .................. G08G 1/166; B60W 30/09; B60W 30/18027; B60W 2554/00; B60W 2555/60
See application file for complete search history.

(56) References Cited

U.S. PATENT DOCUMENTS

| | | | |
|---|---|---|---|
| 2016/0176398 A1* | 6/2016 | Prokhorov | B60W 30/09 701/23 |
| 2017/0057474 A1* | 3/2017 | Zeng | B60T 7/22 |
| 2017/0344855 A1* | 11/2017 | Mande | G06K 9/00785 |

FOREIGN PATENT DOCUMENTS

| | | |
|---|---|---|
| DE | 103 19 700 A1 | 11/2004 |
| DE | 10 2010 035 978 A1 | 4/2011 |
| DE | 10 2012 021 282 A1 | 4/2014 |
| DE | 10 2013 214 305 A1 | 1/2015 |
| DE | 10 2017 000 330 A1 | 7/2017 |

* cited by examiner

*Primary Examiner* — Dale W Hilgendorf
*Assistant Examiner* — Hana Lee
(74) *Attorney, Agent, or Firm* — Maginot, Moore & Beck LLP

(57) ABSTRACT

The disclosure relates to an improved way to avoid or clear a traffic jam. In particular, the disclosure relates to a method for the operation of a vehicle in which at least partial intersection by a dynamic object with a first section of the traffic area occupied by the vehicle is predicted, wherein the vehicle is in a waiting situation waiting for a release for onward travel. Then a trajectory of the vehicle is determined, which at least clears or avoids the intersection by the dynamic object with the first section of the traffic area. Further, the disclosure relates to a device for the operation of a vehicle, a program element and a computer-readable medium with such a program element.

7 Claims, 2 Drawing Sheets

METHOD AND DEVICE FOR THE OPERATION OF A VEHICLE TO AVOID OR CLEAR A TRAFFIC JAM

This application claims priority under 35 U.S.C. § 119 to application no. DE 10 2018 219 911.6, filed on Nov. 21, 2018 in Germany, the disclosure of which is incorporated herein by reference in its entirety.

TECHNICAL FIELD

The present disclosure relates to a method as well as a device for the operation of a vehicle, which may in particular be a vehicle that drives at least partially automatically. Further, the disclosure relates to a program element and a computer-readable storage medium with such a program element.

BACKGROUND

Dynamic objects, such as pedestrians, passenger cars, trucks, buses, etc., can be detected, especially in the area of at least partially automatically driving vehicles. For this purpose, for example, an object classification can be used, based on which a driving strategy of the vehicle is determined, for example, a trajectory of the at least partially automatically driving vehicle can be planned for onward travel, etc. Data from vehicle environment capture, data from a digital map, information on the applicable traffic rules or the like can be used for this purpose.

It is also conceivable that traffic situations may occur in which several vehicles meet and block each other's onward travel, for example because the routes intersect. In the case of conventional vehicles, such a traffic situation can often be cleared cooperatively by coordinating or agreement regarding evasive maneuvers or the like by signs, gestures, etc., which can contribute to avoiding or can even avoid traffic blockages or traffic jams. In particular, for vehicles which drive at least partially automatically, and which do not allow agreement with another road user, there may therefore be a desire for a possibility of avoiding or clearing such or similar traffic situations.

SUMMARY

Embodiments of the disclosure provide an improved method and a device for the operation of a vehicle. Appropriate developments of the disclosure result from the description as well as the accompanying figures.

A method of operating a vehicle proposed in accordance with a first aspect is particularly suitable for the operation of a vehicle which drives at least partially automatically. The procedure can support at least part of a driving function of the vehicle, i.e. being part of a driving assistance system, for example. The method can be carried out with computer support by an electronic control unit or a control unit network of the vehicle, for example, wherein the control unit may comprise, for example, at least one processor, a memory for program instructions and/or data, and a data interface, etc. The method can be implemented as a program element that can include one or more program modules. The method provides for the following steps:

An at least partial intersection by a dynamic object with a first section of the traffic area occupied by the vehicle is predicted, wherein the vehicle is in a waiting situation while waiting for a release for onward travel.

The waiting situation can be caused, for example, by a traffic regulation, bumper-to-bumper traffic or the like. The vehicle does not necessarily have to be stationary, but can be moving slowly towards a stopping area, a stopping point or similar at walking pace, etc. The intersection with the first section of the traffic area can be caused, for example, by the fact that there is not enough space available for the dynamic object, for example due to a required turning circle, etc. of the dynamic object. The prediction can be made by means of a calculation, for example, on the basis of data from vehicle environment capture, map data, etc.

At least one trajectory of the vehicle is determined, for example planned or the like, which at least resolves or avoids the intersection by the object with the first section of the traffic area.

The determined trajectory may in particular be part of an evasive maneuver in order to give or release to the dynamic object the space expected to be required by the object. The vehicle can thus clear a traffic jam (even only a jam that is developing) caused by meeting the dynamic object by giving the object the required travel space, in particular in its own section of the traffic area, so that the dynamic object can continue its journey with minimum hindrance.

This configuration can prevent a blocking situation by the vehicle, which in other words cooperates with the dynamic object. This allows, for example, the flow of traffic in the vehicle environment to be maintained. This can help to increase customer value and avoid unpleasant situations for vehicle passengers.

According to one development, the vehicle can be controlled along the specified trajectory to a second section of the traffic area for which no intersection by the object is predicted. In other words, the vehicle can release its own section of the traffic area. This allows the dynamic object to be given the required travel space.

In one development, the second section of the traffic area may be arranged behind the first section of the traffic area in the direction of travel of the vehicle and the trajectory may be directed opposite to the (actual) direction of travel of the vehicle. The trajectory, for example, can enclose an angle with the direction of travel, so that the trajectory can include both reversing, sideways travel, maneuvering and a combination thereof. This allows the travel space required by the dynamic object to be released reliably and quickly.

According to one development, for predicting a dimension can be determined by which the object is expected to intersect the first section of the traffic area and at least one point, line, surface, section or similar that is located outside the specific dimension or adjacent thereto is determined. The dimension can be, for example, an area dimension or similar. As a result, the expected travel space can be reliably determined.

In one development, the second section of the traffic area may be determined on the basis of at least one defined point, line, area, section or similar. In other words, the second section of the traffic area can extend away from where the dynamic object and the vehicle are not expected to intersect or touch. If necessary, a safety distance from the dynamic object or the predicated trajectory thereof can be maintained. As a result, the traffic space can be used well without the vehicle wasting space unnecessarily.

According to one development, a vehicle environment between the first and second sections of the traffic area can be checked for free navigability in order to determine the trajectory and the trajectory can be determined at least up to an obstacle. For example, the navigability of a rear space relative to the vehicle can be taken into account. If this is blocked by another road user or a static object before reaching the stopping point, only the maximum possible area is determined or driven as a trajectory.

As a result, a blockage situation can be avoided or cleared in a way that is safe for traffic.

In one development, for predicting, the object can be classified on the vehicle side and/or a contour of the object can be at least partly determined. For example, for predicting, it can be determined whether the detected dynamic object threatens to intersect with the traffic area of the vehicle due to its width, length, and so on, depending on an existing lane geometry. For example, the classification may include object types, such as a bus, trucks, and other objects that exceed a certain size and length. This can make the prediction even more reliable and accurate.

According to one development, kinematic data of the object can be determined for predicting. This can be done, for example, by analyzing data of the vehicle environment. Thus, taking into account the kinematic data, it is possible to determine with which area the dynamic object will intersect the first part of the vehicle's traffic area. For example, at the boundaries of said area, the second section of the traffic area can be determined using a most distant end. This can lead to an even more precise prediction.

In one development, the vehicle can wait at a traffic sign that regulates the way forward, which is selected from: a light signal system, a stop sign, give way sign and the like. Such a traffic situation can be used as a trigger for predicting, wherein, for example, the corresponding program element for predicting and determining the trajectory is executed.

According to one development, the dynamic object can approach the vehicle, i.e. have a direction of travel that is directed opposite to the direction of travel of the vehicle, possibly also at an angle. For example, the dynamic object can turn from a crossroad onto a road being used by the vehicle, and so on.

A device proposed according to a second aspect for the operation of a vehicle may be suitable in particular for operation by means of the method described above. In particular, the device comprises a first data interface, which is set up to obtain data captured from a vehicle environment. In addition, data from a digital map, etc., can also be obtained via the first data interface. The device also comprises a data processing device which, for example, comprises a processor, a data memory for program instructions, etc. and is set up to predict an at least partial intersection by a dynamic object with the first section of the traffic area occupied by the vehicle at least based on the captured data when the vehicle is stationary or moving at walking pace while waiting for a release signal to continue driving. In addition, the data processing device is set up to determine a trajectory of the vehicle which at least clears or avoids the intersection by the object with the first section of the traffic area. The device also comprises a second data interface that is set up to provide driving control data for the vehicle, which includes the determined trajectory.

This essentially allows the effects discussed above for the method to be achieved.

In one development, the prediction can be carried out by an artificial intelligence module implemented in the data processing device, which may, for example, comprise an artificial neural network that may be trained for this task.

According to a third aspect, the disclosure relates to a program element, in particular a computer program, for the operation of a vehicle which, when executed by a processor of a data processing device, is set up to perform a method according to the first aspect.

A fourth aspect of the disclosure relates to a computer-readable storage medium with a program element, in particular a computer program, according to the third aspect.

Further measures that improve the disclosure are presented below in detail together with the description of the preferred exemplary embodiments of the disclosure on the basis of figures.

BRIEF DESCRIPTION OF THE DRAWINGS

Advantageous embodiments of the disclosure are described below in detail with reference to the accompanying figures. In the figures.

DETAILED DESCRIPTION

Figure 1:
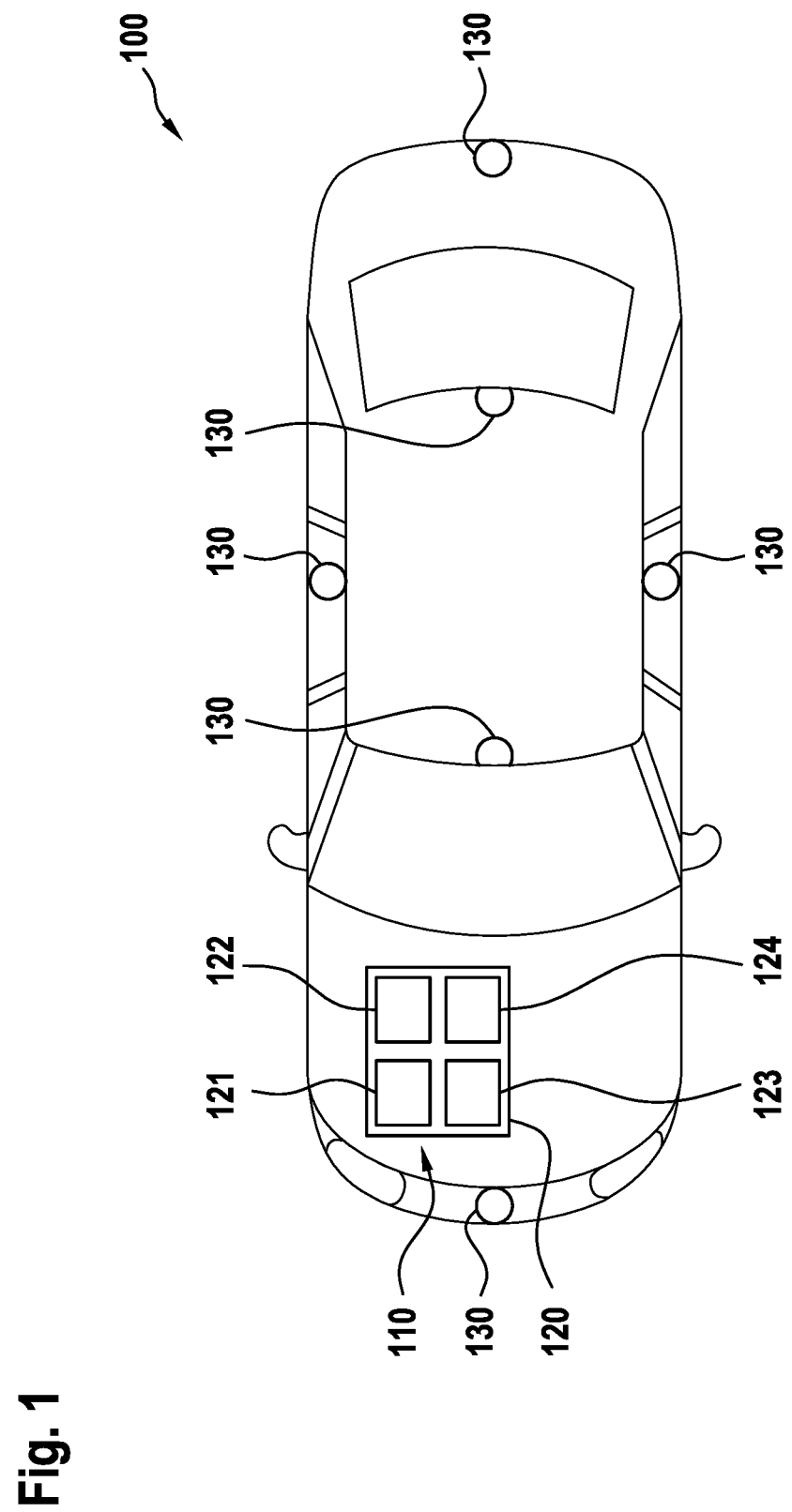
FIG. 1 shows a schematic representation of a device for the operation of a vehicle according to an embodiment of the disclosure.

The figures are only schematic and are not true to scale. In the figures, the same, equivalent or similar elements are provided with the same reference characters throughout.

FIG. 1 shows a vehicle 100, which is an at least partially automatically driving motor vehicle. Accordingly, the vehicle 100 comprises actuators (not referred to in detail) and a vehicle drive, which can be electronically controlled for automated driving control of the vehicle 100, for example for acceleration, braking, steering, etc.

The vehicle 100 also comprises a device 110, for example in the form of a driving assistance system, which a data processing device 120, for example in the form of an electronic control unit, for controlling the actuators and the vehicle drive. The data processing device 120 comprises a processor 121 and a memory 122 for storing program instructions and a program element for operating the vehicle 100. Furthermore, the device 110 comprises a first data interface 123 and a second data interface 124, which are, for example, connected to or integrated into the data processing device 120. In addition, the vehicle 100 comprises a plurality of sensors 130, such as optical sensors, ultrasonic sensors, lidar, etc. The optical sensors 130 are by way of example cameras, which, for example, optically capture the area in front, to the side of and behind the vehicle 100 and feed said captured data via the first data interface 123 to the data processing device 120, which can control the vehicle 100 via the second data interface 124 based on the vehicle environment, i.e. the road traffic, for example.

The data processing device 120 is set up to predict, at least from the captured data, an at least partial intersection by a dynamic object 200 with a first section of the traffic area 140 occupied by the vehicle 100, when the vehicle is in a waiting situation waiting for a release signal to continue driving. Furthermore, the data processing device 120 is set up to determine a trajectory 150 of the vehicle 100, which at least clears or avoids the intersection with the first section of the traffic area 140 by the object 200. In addition, the data processing device is set up to provide, via the second data interface 124, driving control data for the vehicle 100 including the specified trajectory 150 towards a second section of the traffic area 160.

Figure 2:
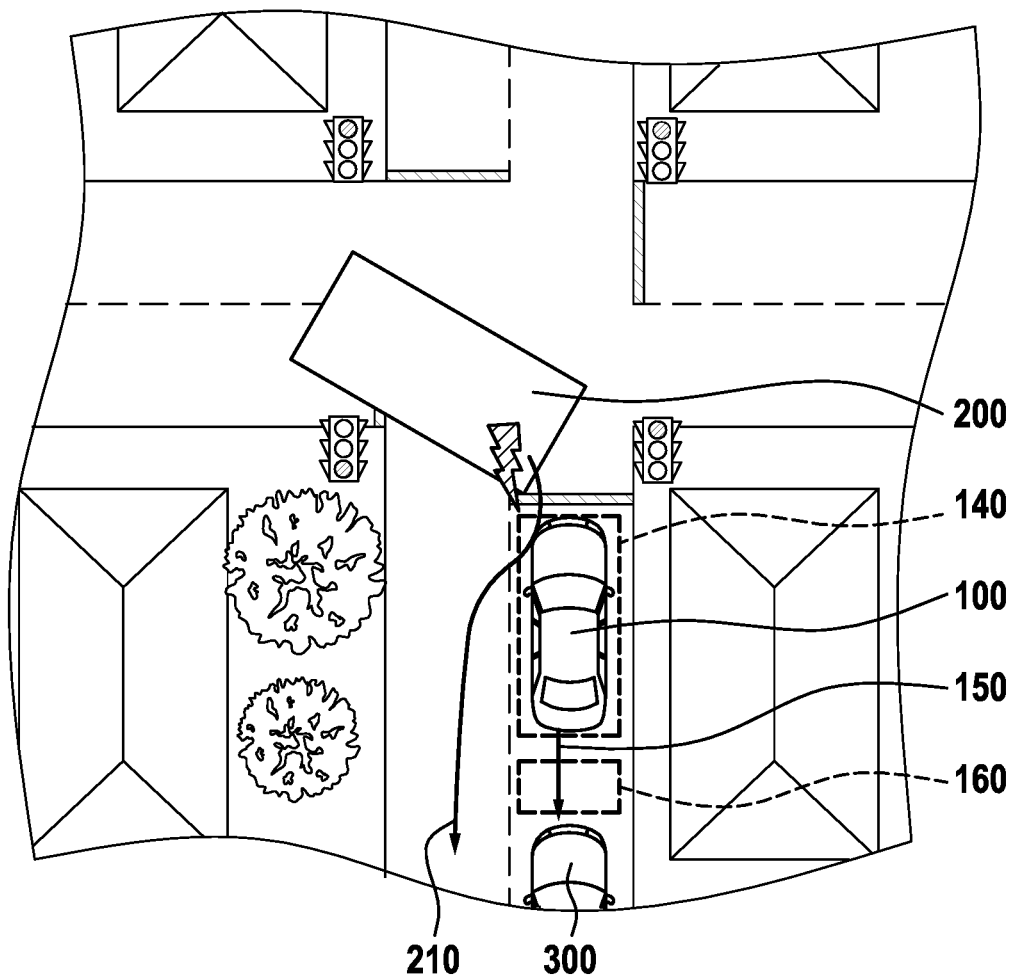
FIG. 2 shows a schematic representation of an exemplary traffic situation, which can be taken into account with a method or a device for the operation of a vehicle according to an embodiment of the disclosure.

FIG. 2 shows an exemplary traffic situation in which the vehicle 100 is in a waiting situation and in which the vehicle 100 is approached by the dynamic object 200 in the form of a bus. The traffic situation includes an intersection where two roads meet, with a right of way controlled by several light signal systems. In this exemplary embodiment, the vehicle 100 is stationary waiting in front of a light signal system, which is emitting a waiting signal for the vehicle 100 with a red light. The dynamic object 200 turns from a crossroad onto the road on which the vehicle 100 is waiting in front of the light signal system in the first section of the traffic area 140.

Using FIG. 2, an exemplary method for the operation of the vehicle 100 in this exemplary traffic situation will now be explained.

Using the sensors 130 and the data processing device 120, the vehicle 100 predictively detects the dynamic object 200 that is moving towards the vehicle. In addition, the vehicle 100 uses the sensors 130 and the data processing device 120 to at least partly determine an object class and/or a contour of the dynamic object 200. Furthermore, the vehicle uses the sensors 130 and the data processing device 120 to determine kinematic data of the dynamic object 200, such as the speed at which the dynamic object 200 is moving towards the vehicle 100, a deceleration or acceleration of the dynamic object 200, an angle between the dynamic object 200 and the vehicle 100, etc.

Based on this data, using the data processing device 120 the vehicle 100 predicts whether the dynamic object 200 will affect or intersect the first section of the traffic area 140, so that the vehicle 100 would block the onward travel of the dynamic object 200. For example, a measure, such as an intersection measure, an area measure or similar, is determined by which the dynamic object 200 is expected to intersect the first section of the traffic area and at least one point is determined that is located outside the specified measure or adjacent to it. For this purpose, depending on a lane geometry and the contour of the oncoming dynamic object 200, taking into account the kinematic data thereof, the area of the dynamic object 200 that will intersect the section of the traffic area 140 of the vehicle 100 during the turning maneuver thereof is determined. At the borders of this area, a point, line or similar will be determined at the farthest end, and a stopping point for the vehicle 100 will be determined relative to that point, line, etc., possibly taking into account a safety distance, the second section of the traffic area 160 and the trajectory 150.

In addition, the vehicle 100 uses the sensors 130 and the data processing device 120 to determine whether the vehicle environment between the first and second sections of the traffic area 140, 160 can be freely traversed. In this exemplary embodiment, there is another road user 300 in the form of a motor vehicle behind the vehicle 100 in the direction of travel that is also waiting at the light signal system for onward travel. In this case, the vehicle 100 determines the second section of the traffic area 160 and the trajectory 150 by means of the sensors 130 and the data processing device 120, so that the vehicle 100 can be controlled to just up to the other road user 300, possibly with a safety distance.

Onward travel of the vehicle 100 is determined and controlled when the dynamic object has completely left the traffic situation ahead. If the light signal system gives a release signal, i.e. emits green light, the vehicle 100 is controlled for onward travel.

Figure 3:
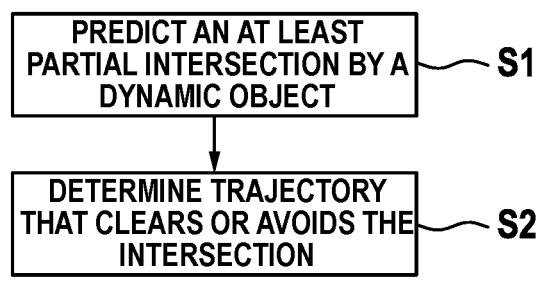
FIG. 3 shows a flowchart of a method for operating a vehicle according to an embodiment of the disclosure.

FIG. 3 summarizes a method for operating the vehicle 100 in a flowchart. First, in a first step S1 a prediction is made of at least partial intersection by the dynamic object 200 with the first section of the traffic area 140 occupied by the vehicle 100, wherein the vehicle 100 is in a waiting situation waiting for a release to continue. Then, in a second step S2, a determination of the trajectory 150 of the vehicle 100 is carried out that at least clears or avoids the intersection by the dynamic object 200 with the first section of the traffic area 140.

What is claimed is:

1. A method for operating a vehicle, the method comprising:
   while the vehicle is waiting in a waiting situation for a release for onward travel, predicting at least a partial intersection by a dynamic object with a first section of a traffic area occupied by the vehicle, the predicting of the at least partial intersection comprising:
      determining an intersection area over which the dynamic object is expected to intersect the first section of the traffic area; and
      determining a rearmost point of the intersection area relative to a direction of travel of the vehicle;
   determining a trajectory of the vehicle which clears or avoids the intersection by the dynamic object with the vehicle, the determining of the trajectory comprising:
      determining a second section of the traffic area that is rearward of the vehicle based on the rearmost point;
      checking a vehicle environment between the first and second sections for an obstacle; and
      determining a stopping point for the vehicle as a maximum possible area based on a maximum possible rearward movement up to the obstacle; and
   controlling the vehicle along the determined trajectory to the stopping point,
   wherein:
      the determining of the intersection area comprises calculating an area dimension over which the dynamic object is expected to intersect the first section of the traffic area; and
      the determining of the rearmost point of the intersection area includes determining the rearmost point of the calculated area dimension over which the dynamic object is expected to intersect the first section of the traffic area.

2. The method according to claim 1, the predicting further comprising at least one of:
   classifying the dynamic object as a bus, truck, passenger car, or pedestrian; and
   determining, at least partly, a contour of the dynamic object.

3. The method according to claim 1, the predicting further comprising:
   determining kinematic data of the dynamic object, the kinematic data including at least one of a speed of the dynamic object and a deceleration or acceleration of the dynamic object.

4. The method according to claim 1, wherein the vehicle is waiting at a traffic sign that controls a way forward, the traffic sign being one of (i) a light signal system, (ii) a stop sign, and (iii) a give way sign.

5. A device for the operation of a vehicle, the device comprising:
   a data processing device configured to:
      obtain data from a vehicle environment;
      while the vehicle is waiting in a waiting situation for a release for onward travel, predict, at least from the obtained data, at least a partial intersection by a dynamic object with a first section of a traffic area occupied by the vehicle, the predicting of the at least partial intersection including:
   determining an intersection area over which the dynamic object is expected to intersect the first section of the traffic area; and
   determining a rearmost point of the intersection area relative to a direction of travel of the vehicle;
determine a trajectory of the vehicle which one of clears and avoids the intersection by the dynamic object with the first section of the traffic area the determining of the trajectory including:
   determining a second section of the traffic area that is rearward of the vehicle based on the rearmost point;
   checking a vehicle environment between the first and second sections for an obstacle; and
   determining a stopping point for the vehicle as a maximum possible area based on a maximum possible rearward movement up to the obstacle; and
   provide driving control data for the vehicle that include the determined trajectory, the data processing device being configured to control the vehicle along the determined trajectory to the stopping point,
wherein the data processing device is further configured such that:
   the determining of the intersection area comprises calculating an area dimension over which the dynamic object is expected to intersect the first section of the traffic area; and
   the determining of the rearmost point of the intersection area includes determining the rearmost point of the calculated area dimension over which the dynamic object is expected to intersect the first section of the traffic area.

6. The device according to claim 5, wherein data processing device is further configured to execute a program to predict the at least a partial intersection and to determine the trajectory.

7. The device according to claim 6, wherein the program is stored on a computer-readable medium.

* * * * *